US012097636B2

(12) United States Patent
Yuan

(10) Patent No.: US 12,097,636 B2
(45) Date of Patent: Sep. 24, 2024

(54) LIFT TABLE ATTACHMENT FOR TWO-WAY LOG SPLITTERS

(71) Applicant: Duro Industries, LLC, Dover, DE (US)

(72) Inventor: Yue Yuan, Dover, DE (US)

(73) Assignee: Duro Industries, LLC, Dover, DE (US)

( * ) Notice: Subject to any disclaimer, the term of this patent is extended or adjusted under 35 U.S.C. 154(b) by 242 days.

(21) Appl. No.: 17/962,291

(22) Filed: Oct. 7, 2022

(65) Prior Publication Data

US 2024/0116210 A1 Apr. 11, 2024

(51) Int. Cl.
*B27L 7/06* (2006.01)

(52) U.S. Cl.
CPC ...................................... *B27L 7/06* (2013.01)

(58) Field of Classification Search
CPC ................. B27L 7/00; B27L 7/06; B27L 7/08
See application file for complete search history.

(56) References Cited

U.S. PATENT DOCUMENTS 3,862,651 A * 1/1975 Heikkinen ................ B27L 7/00 144/194
4,431,362 A 2/1984 Wech, Jr. et al.
4,544,008 A * 10/1985 Reini ........................ B27L 7/00 144/195.1
4,842,030 A * 6/1989 Meyer ....................... B27L 7/00 144/195.1
5,337,810 A 8/1994 McCormack
2011/0048580 A1 3/2011 Hicks
2011/0079323 A1 * 4/2011 Green ........................ B27L 7/06 144/195.8
2012/0073704 A1 * 3/2012 Larrabee ................... B27L 7/00 144/195.1

FOREIGN PATENT DOCUMENTS

CN 219255880 U 6/2023

OTHER PUBLICATIONS

Morris, William. "Champion 25ton Log Splitter Modifications". YouTube. Sep. 12, 2022 [retrieved on Nov. 10, 2023]. Retrieved from the Internet: <URL: https://www.youtube.com/watch?v=qnmBDfGyrWU> entire video.

* cited by examiner

*Primary Examiner* — Matthew Katcoff
(74) *Attorney, Agent, or Firm* — Georgiy L. Khayet

(57) ABSTRACT

Provided is a lift table apparatus for log splitting. The lift table apparatus includes a lift frame, a lock pin, a control lever, and a cable. The lift frame is configured to be attached to a beam and a hydraulic cylinder of a log splitter. The lift frame is movable from a vertical position to a horizontal position by the hydraulic cylinder when the hydraulic cylinder is retracted. The lock pin is configured to be attached to the beam and locks the lift frame in the horizontal position. The control lever is configured to be attached to a hydraulic flow control valve of the log splitter. The cable is connected to the lock pin and the control lever. When the control lever is pulled out, the cable pulls the lock pin out to enable the lift frame to be released from the horizontal position and moved to the vertical position.

20 Claims, 9 Drawing Sheets

LIFT TABLE ATTACHMENT FOR TWO-WAY LOG SPLITTERS

TECHNICAL FIELD

This disclosure relates to attachments for log splitters. More specifically, this disclosure relates to a lift table attachment for log splitters.

BACKGROUND

Most conventional log splitters are hydraulically powered and enable an operator to split logs that are heavier than the operator can lift or move. To relieve the operator from the need to lift logs to a beam of the log splitter where a splitting wedge can split the logs, log splitters can be equipped with log lifters. The log lifters may be hydraulically powered to help the operator with lifting logs. However, conventional log lifters typically require the operator to perform additional actions in order to ensure that the log lifter with a log remains in the horizontal position.

A hydraulic cylinder of a log splitter is controlled by a hydraulic valve. The operator can control the hydraulic valve by using a control lever of the hydraulic valve. However, in conventional log splitters, the control lever is used only for controlling the hydraulic valve and does not control any other functions, such as fixing the log lifter in the required position.

Conventional log splitters with log lifters have two control levers, one of which controls the splitting wedge and another for controlling the log lifter. Additionally, in some log splitters, the splitting wedge and the log lifter cannot be operated simultaneously. Thus, the operator first splits the log with the splitting wedge and then proceeds to moving the log lifter into the position required for loading further logs onto the log lifter.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to a lift table attachment for log splitters. According to one example embodiment of the present disclosure, a lift table apparatus for log splitting is provided. The lift table apparatus may include a lift frame, a lock pin, a control lever, and a cable. The lift frame may be configured to be attached to a beam of a log splitter and to a hydraulic cylinder of the log splitter. The lift frame can be movable from a vertical position into a horizontal position by the hydraulic cylinder when the hydraulic cylinder is retracted. The lock pin may be configured to be attached to the beam and to lock the lift frame into the horizontal position. The lock pin can be spring-loaded. The control lever can be configured to be attached to a hydraulic flow control valve of the log splitter. The hydraulic flow control valve can be configured to control a hydraulics flow supplied to the hydraulic cylinder. The control lever can be slidable and spring-loaded. The cable can be connected to the lock pin and the control lever. When the control lever is pulled out, the cable can pull the lock pin out to release the lift frame from the horizontal position and move it into the vertical position.

According to another embodiment of the present disclosure, a method for providing a lift table apparatus is provided. The method may commence with providing a lift frame. The lift frame can be configured to be attached to a beam of a log splitter and to a hydraulic cylinder of the log splitter. The lift frame can be movable from a vertical position into a horizontal position by the hydraulic cylinder when the hydraulic cylinder is retracted. The method may further include providing a lock pin. The lock pin may be configured to be attached to the beam and to lock the lift frame in the horizontal position. The lock pin may be spring-loaded. The method may continue with providing a control lever. The control lever may be configured to be attached to a hydraulic flow control valve of the log splitter. The hydraulic flow control valve may be configured to control a hydraulics flow supplied to the hydraulic cylinder. The control lever may be slidable and spring-loaded. The method may further include providing a cable. The cable may be connected to the lock pin and the control lever. When the control lever is pulled out, the cable may pull the lock pin out to enable the lift frame to be released from the horizontal position and moved into the vertical position.

Other example embodiments of the disclosure and aspects will become apparent from the following description taken in conjunction with the following drawings.

BRIEF DESCRIPTION OF DRAWINGS

Example embodiments are illustrated by way of example and not limitation in the figures of the accompanying drawings, in which like references indicate similar elements.

DETAILED DESCRIPTION

Figure 1:
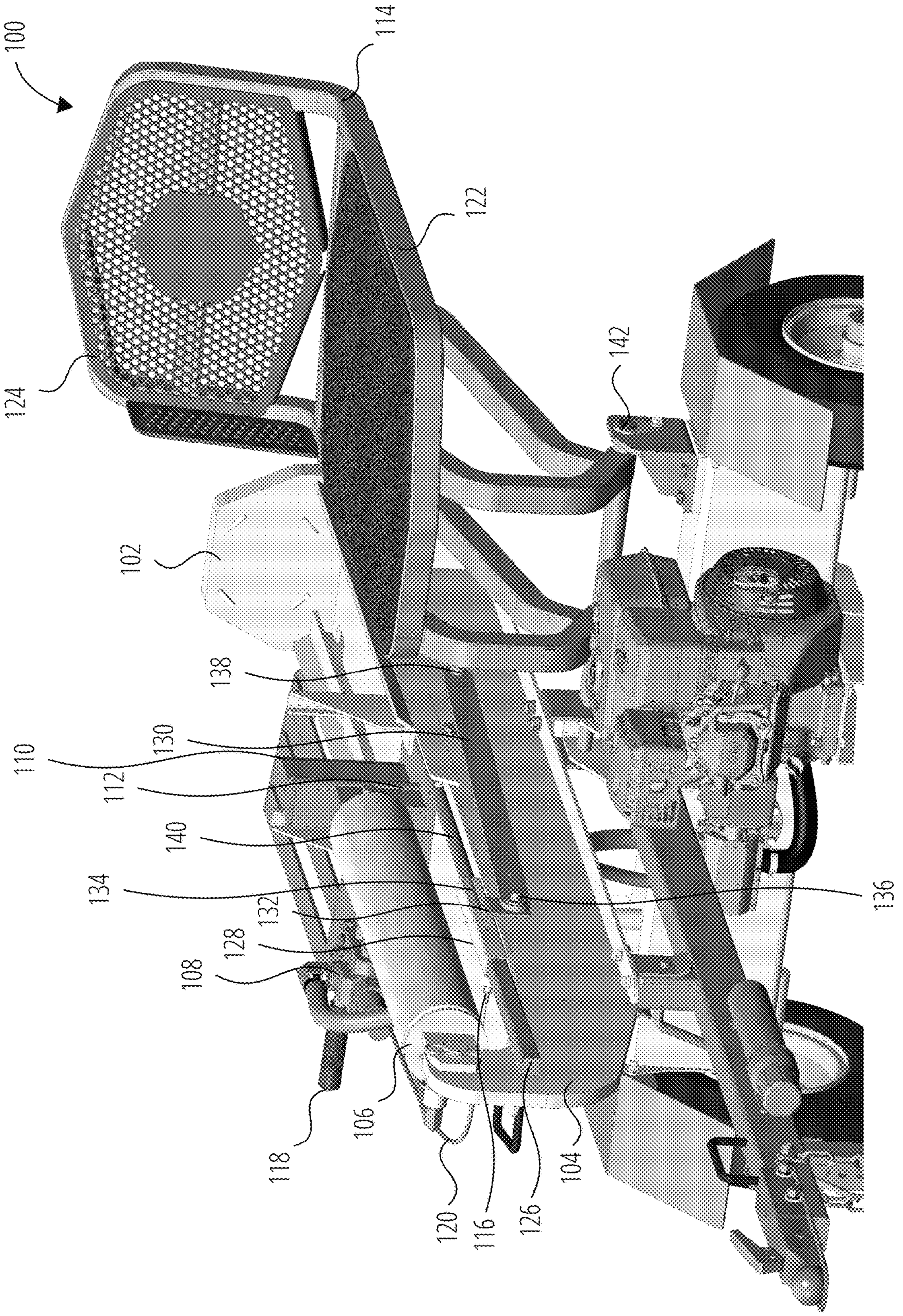
FIG. 1 is a front perspective view of a lift table apparatus for log splitting in a horizontal position, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

Generally, the embodiments of this disclosure are concerned with a lift table attachment for two-way log splitters. Two-way log splitters are log splitters configured to split logs in a horizontal position and in a vertical position. A conventional log splitter may have a beam positioned horizontally when the log splitter operates in a horizontal position or vertically when the log splitter operates in a vertical position. The log splitter may also have a hydraulic cylinder, which may be positioned on the beam, and a splitting wedge, which may be connected to and movable by the hydraulic cylinder. The hydraulic cylinder may be operated by a hydraulic flow control valve of the log splitter. The hydraulic flow control valve may be configured to control a hydraulics flow supplied to the hydraulic cylinder, thereby controlling the splitting wedge connected to the hydraulic cylinder. The hydraulic cylinder can also function as a log pusher. The extension of the hydraulic cylinder causes movement of the splitting wedge towards a log placed on the beam of the log splitter and results in splitting of the log. The retraction of the hydraulic cylinder causes the reverse movement of the splitting wedge towards an initial position for placing the next log on the beam.

The lift table attachment of the present disclosure is also referred herein to as a lift table apparatus. The lift table apparatus can be configured to attach to conventional log splitters existing in the market. The lift table apparatus may include a lift frame configured to be attached to a side of a beam of a log splitter and to a hydraulic cylinder of the log splitter. When connected to the log splitter, the lift frame can be movable from a vertical position into a horizontal position by the hydraulic cylinder when the hydraulic cylinder is retracted. The lift table apparatus may further include a lock pin configured to be attached to the beam of the log splitter. Specifically, the lock pin may be spring-loaded and configured to engage the beam of the log splitter to lock the lift frame into the horizontal position.

The lift table apparatus may further include a control lever configured to be attached to a hydraulic flow control valve of the log splitter. The hydraulic flow control valve of the log splitter may control a hydraulics flow supplied to the hydraulic cylinder. The control lever may be slidable and spring-loaded. Specifically, the control lever may include a sliding grip, which may be spring-loaded. The lift table apparatus may further include a cable connected to the lock pin and the control lever. When the sliding grip of the control lever is pulled out, the cable connected to the control lever may pull the lock pin out (i.e., disengage the lock pin and the beam) to enable the lift frame to be released from the horizontal position and moved into the vertical position.

Thus, the lift table apparatus can be connected to the hydraulic cylinder of the log splitter, such that the hydraulic cylinder may turn the lift table apparatus to lift the logs when the hydraulic cylinder retracts. When the lift table apparatus reaches the horizontal position, the lock pin may engage the beam to automatically secure the lift table apparatus into place such that the lift table apparatus may stop moving with the hydraulic cylinder. Specifically, when the lift table apparatus is locked into the horizontal position by the lock pin, the lift table apparatus is no longer moved by the hydraulic cylinder, which continues moving the splitting wedge to split logs. Upon reaching the horizontal position by the lift table apparatus, the lift table apparatus can be used as a cradle/log table, such that an operator can split the logs into pieces one by one.

The control lever can cause the lift frame to resume moving with the hydraulic cylinder from the vertical position into the horizontal position for lifting the next logs. Therefore, the extension of the hydraulic cylinder can cause movement of the lift frame from the horizontal position into the vertical position and retraction of the hydraulic cylinder can cause movement of the lift frame from the vertical position into the horizontal position.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 is a front perspective view of a lift table apparatus 100 for log splitting, according to an example embodiment. The lift table apparatus 100 may be configured to be attached to any conventional log splitter. A sample conventional log splitter is shown as a log splitter 102. The log splitter 102 may have a beam 104, a hydraulic cylinder 106, and a hydraulic flow control valve 108 for controlling the hydraulic cylinder 106. Specifically, the hydraulic flow control valve 108 may be configured to control a hydraulics flow supplied to the hydraulic cylinder 106. The beam 104 may be positioned horizontally as shown in FIG. 1 or vertically in other example embodiments. The hydraulic cylinder 106 may be disposed along the beam 104 of the log splitter 102. The log splitter 102 may further have a splitting wedge 110 for splitting logs and a wedge base 112 connected to the splitting wedge 110. The splitting wedge 110 may be movable by the hydraulic cylinder 106.

The lift table apparatus 100 may have a lift frame 114. The lift frame 114 may be configured to be attached to the beam 104 of the log splitter 102. In an example embodiment, the lift frame 114 may be attached to a side of the beam 104. Furthermore, the lift frame 114 may be configured to be attached to the hydraulic cylinder 106 of the log splitter 102. The lift frame 114 may be movable from a vertical position to a horizontal position by the hydraulic cylinder 106 when the hydraulic cylinder 106 is retracted. FIG. 1 shows the lift table apparatus 100 in the horizontal position.

The lift table apparatus 100 may further have a lock pin 116. The lock pin 116 may be configured to be attached to the beam 104 of the log splitter 102. The lock pin 116 may be spring-loaded and may be configured to lock the lift frame 114 in the horizontal position by engaging the beam 104.

The lift table apparatus 100 may further include a control lever 118. The control lever 118 may be configured to be attached to the hydraulic flow control valve 108 of the log splitter 102. The control lever 118 may be slidable and spring-loaded.

The lift table apparatus 100 may further have a cable 120. The cable 120 may be connected to the lock pin 116 and the control lever 118. When the control lever 118 is pulled out, the cable 120 may pull the lock pin 116 out to enable the lift frame 114 to be released from the horizontal position shown in FIG. 1 and moved to the vertical position, as shown in FIG. 2.

The lift frame 114 may have a base portion 122 and a side portion 124 attached to the base portion 122. The side portion 124 may be attached to the base portion 122 at an angle of about 90 degrees 15 degrees depending on predetermined structural requirements for loading logs onto the lift frame 114. When the lift frame 114 is placed into the horizontal position, the base portion 122 may be in a horizontal position and the side portion 124 may be in a vertical or substantially vertical position.

Figure 2:
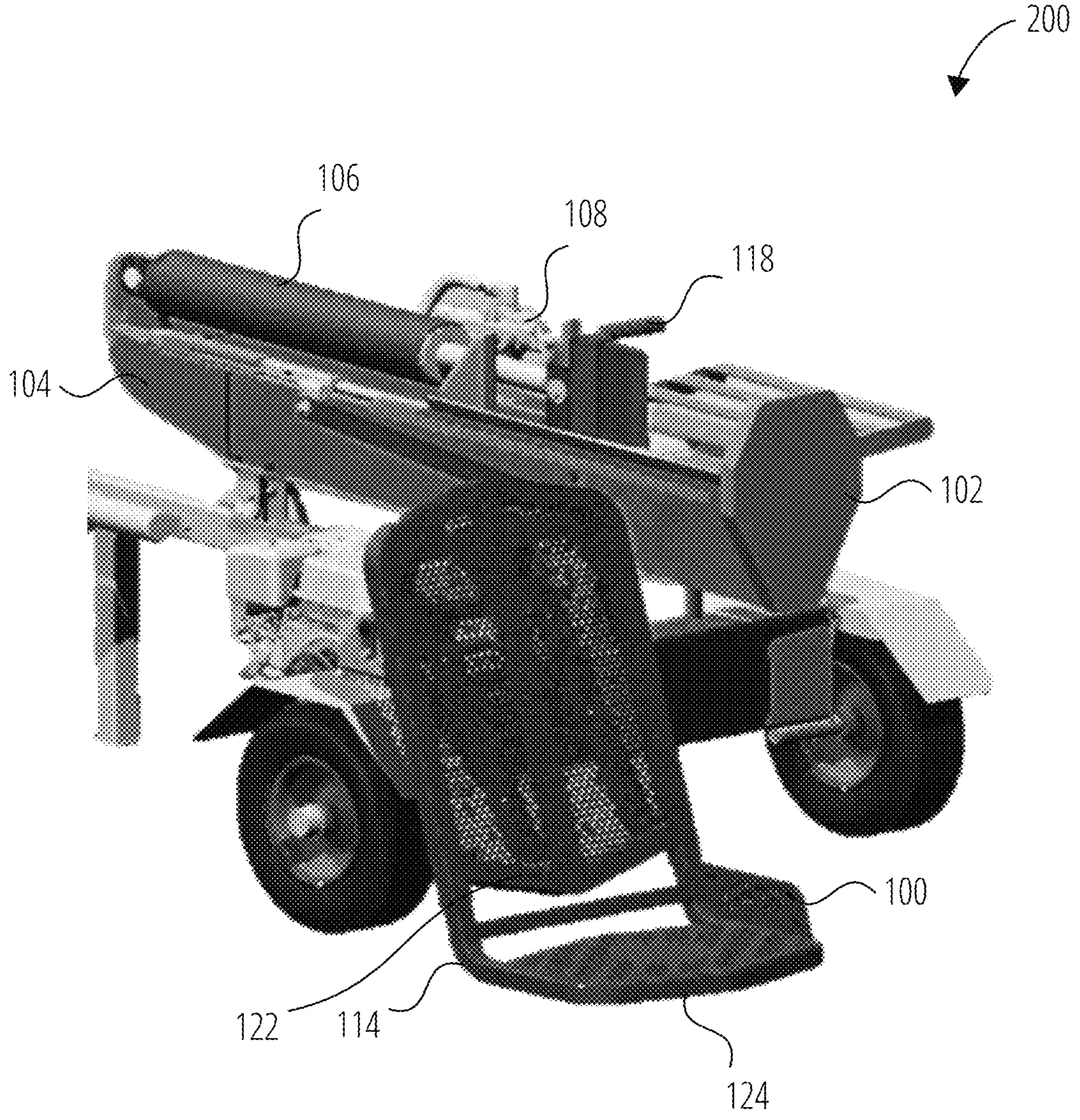
FIG. 2 is a right-side perspective view of a lift table apparatus in a vertical position, according to an example embodiment.

FIG. 2 is a right-side perspective view 200 of a lift table apparatus 100 in a vertical position, according to an example embodiment. When the lift frame 114 is placed into the vertical position, the base portion 122 may be in a vertical position and the side portion 124 may be in a horizontal or substantially horizontal position and ready for loading logs onto the side portion 124 of the lift frame 114. When the lift frame 114 is in the vertical position, an operator of the log splitter may place a log onto the side portion 124 positioned horizontally. Upon moving the lift frame 114 from the vertical position to the horizontal position shown in FIG. 1, the log may move from the side portion 124 to the base portion 122 of the lift frame 114. Upon fixing the lift frame 114 in the horizontal position, the operator may move the log from the base portion 122 to the beam 104 of the log splitter 102 for splitting.

Referring again to FIG. 1, the lift table apparatus 100 may further have a drive rod 126, a guide tube 128 for enclosing and driving the drive rod 126, and a link rod 130 that connects the lift frame 114 to the drive rod 126. The guide tube 128 may be configured to be connected to the beam 104 of the log splitter 102.

As shown in FIG. 1, the lift table apparatus 100 may further have a bracket 132 that may connect by one end to the link rod 130 and connect by another end to the drive rod 126, thereby connecting the link rod 130 to the drive rod 126. The guide tube 128 may have a groove 134 cut in the guide tube 128. The bracket 132 may pass through the groove 134. Therefore, when the drive rod 126 is driven, the bracket 132 may move together with the drive rod 126, thereby moving the link rod 130.

The link rod 130 may be connected to the bracket 132 via a first pivot joint 136 and connected to the lift frame 114 via a second pivot joint 138. When the link rod 130 is moved by the movement of the drive rod 126, the link rod 130 may move the lift frame 114 connected to the link rod 130 from the vertical position to the horizontal position and vice versa. The drive rod 126 is further shown in detail in FIG. 3.

Figure 3:
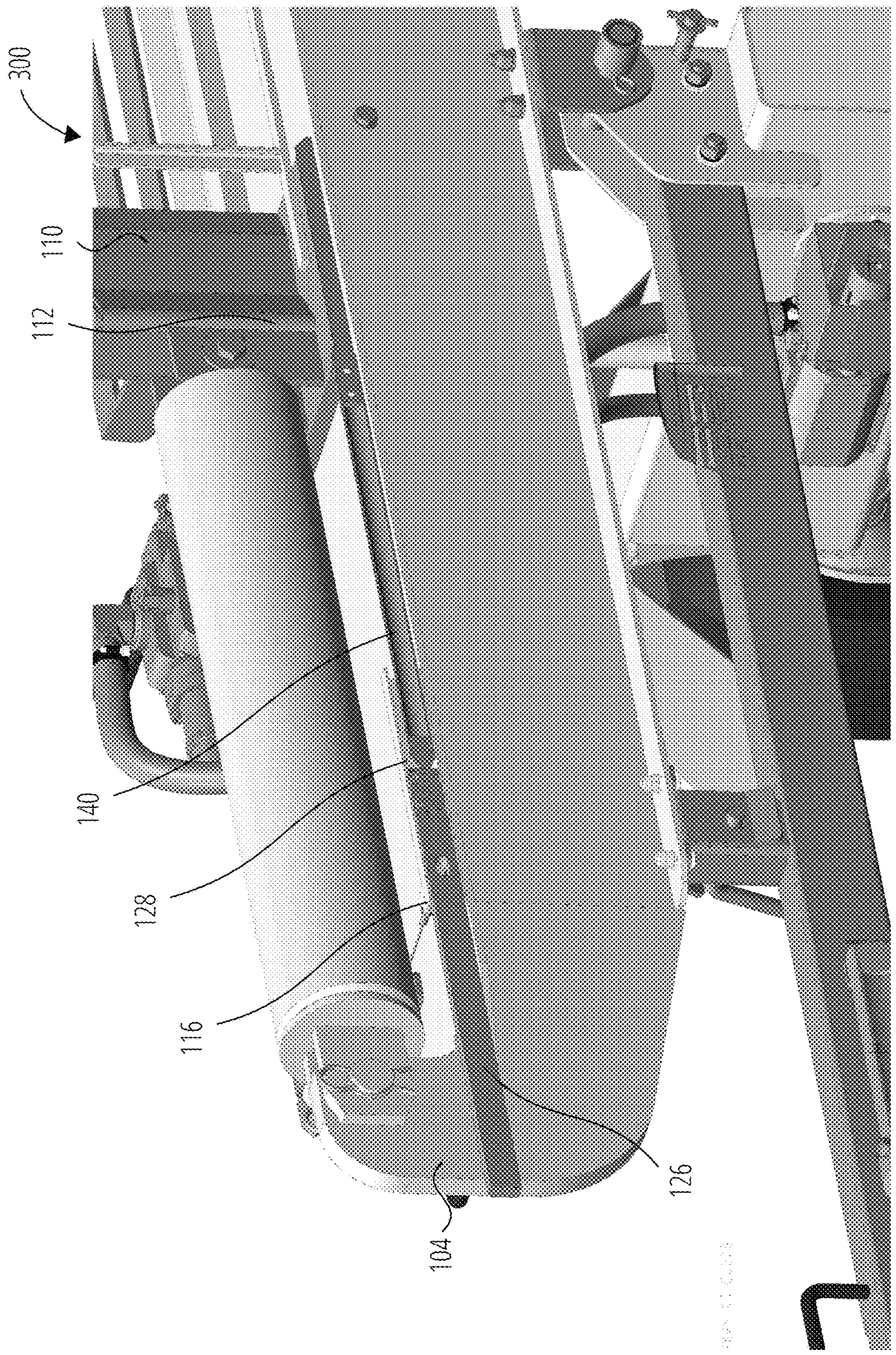
FIG. 3 is a detailed cross-section view of a drive rod of a lift table apparatus, according to an example embodiment.

FIG. 3 is a detailed cross-section view 300 of a drive rod 126 of the lift table apparatus 100, according to an example embodiment. As shown in FIG. 1 and FIG. 3, the lift table apparatus 100 may further have a push rod 140. The push rod 140 may be configured to be connected to a wedge base 112 of the log splitter 102. The push rod 140 may be configured to push the drive rod 126 when the wedge base 112 is moved by the hydraulic cylinder 106 when the hydraulic cylinder 106 is retracted.

Referring again to FIG. 1, the lift table apparatus 100 may further have a pivot shaft 142 configured to be connected to the beam 104 of the log splitter 102. The lift frame 114 may be installed on the pivot shaft 142. Therefore, when the link rod 130 moves the lift frame 114, the lift frame 114 may rotate around the pivot shaft 142.

Figure 4:
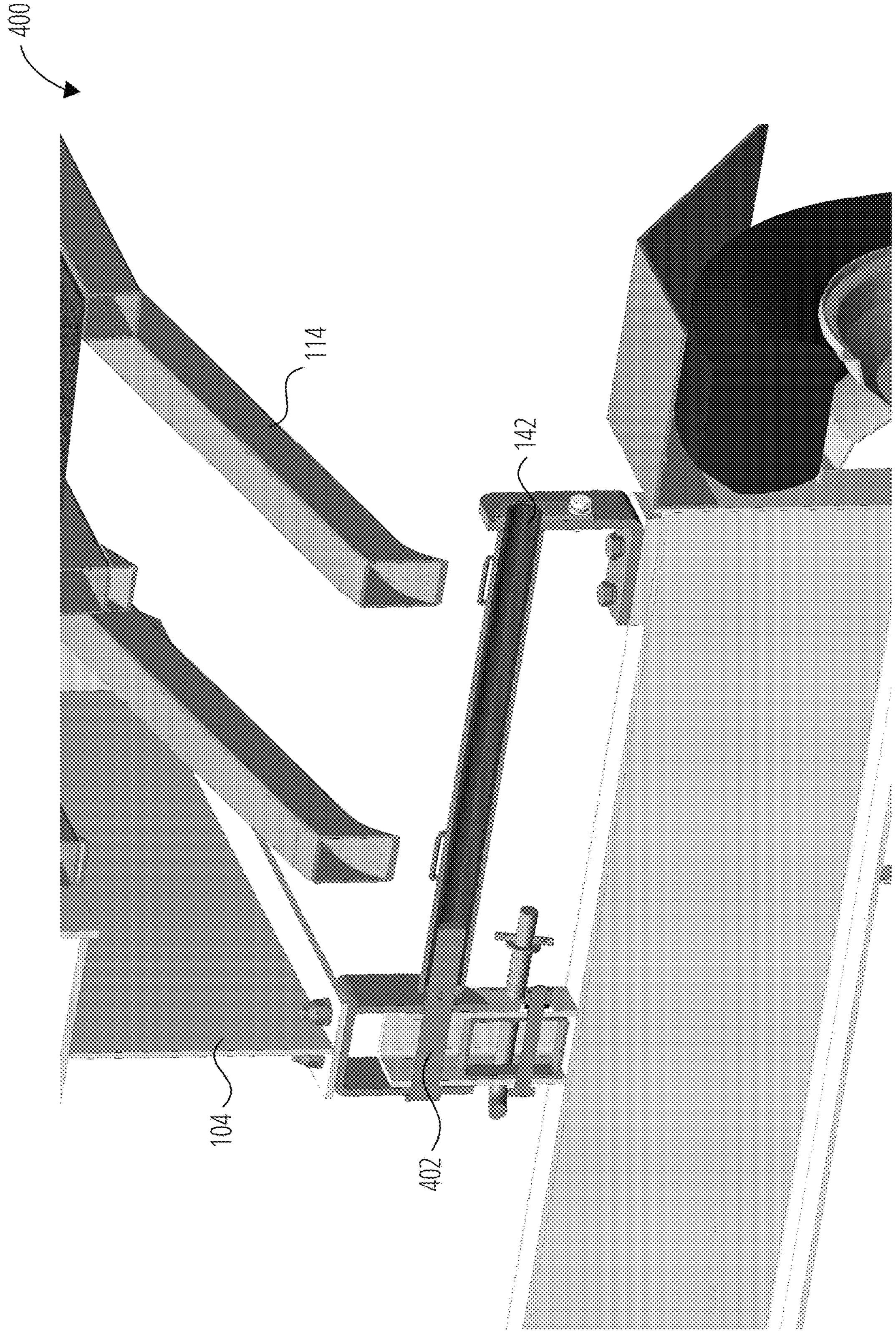
FIG. 4 shows a detailed cross-section view of a pivot shaft of a lift table apparatus, according to an example embodiment.

FIG. 4 shows a detailed cross-section view 400 of a pivot shaft 142 of the lift table apparatus 100, according to an example embodiment. The lift table apparatus 100 may further have a beam pivot shaft 402 configured to be connected to the beam 104 of the log splitter 102. The pivot shaft 142 may partially enclose the beam pivot shaft 402 and may rotate around the beam pivot shaft 402 when the lift frame 114 is moved.

Figure 5:
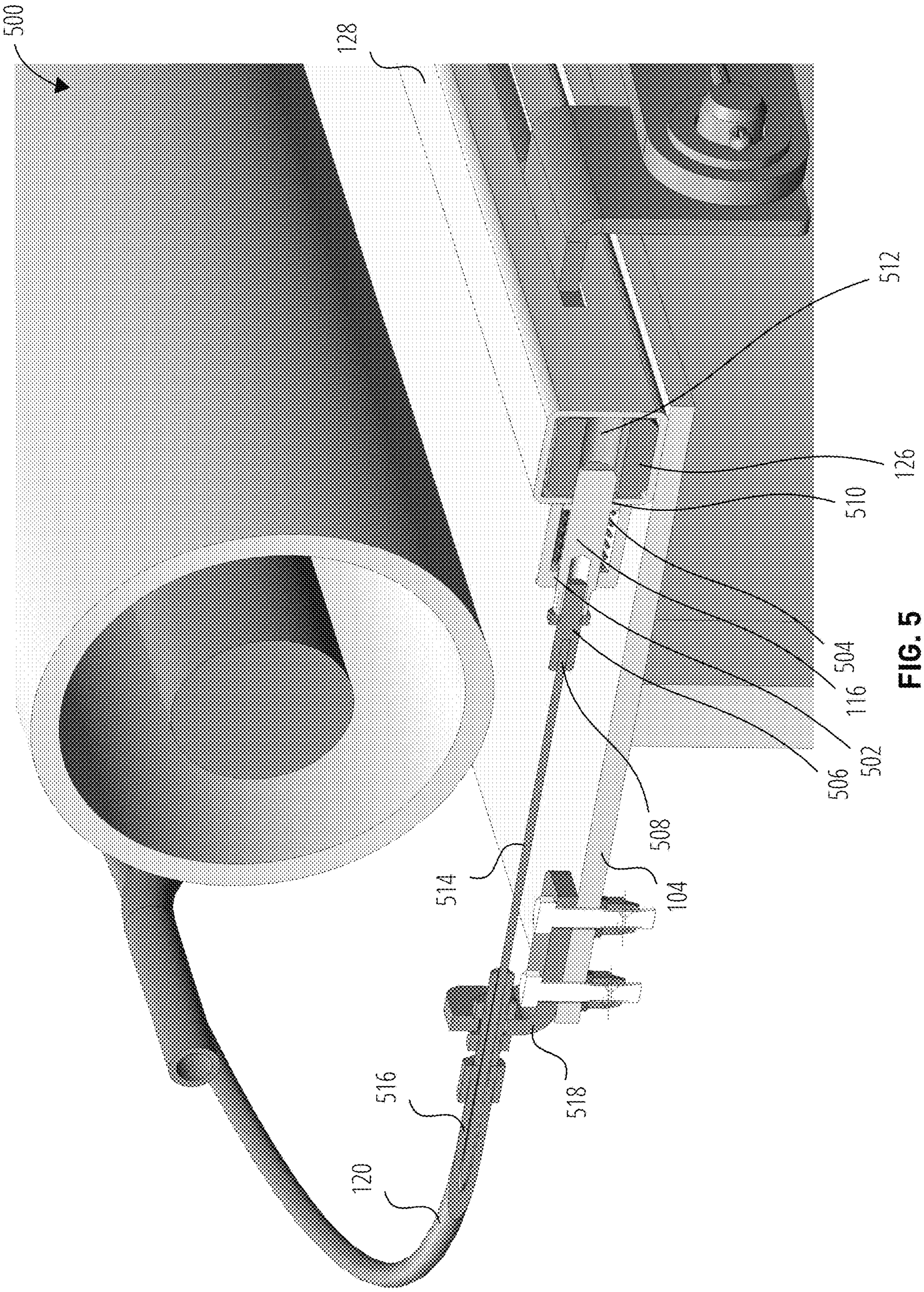
FIG. 5 is a detailed cross-section view of a lock pin of a lift table apparatus, according to an example embodiment.

FIG. 5 is a detailed cross-section view 500 of a lock pin 116 of the lift table apparatus 100, according to an example embodiment. The lift table apparatus 100 may have a lock pin sleeve 502 connected to the guide tube 128. The lock pin 116 may be located inside the lock pin sleeve 502. The lift table apparatus 100 may further have a first spring 504 located inside the lock pin sleeve 502 and configured to load the lock pin 116. The lift table apparatus 100 may further have a first cable connector 506 connected to the lock pin 116. The cable 120 may be connected to the first cable connector 506 by a first end 508 of the cable 120.

The guide tube 128 may have an opening 510. The drive rod 126 may have an opening 512 for engaging the lock pin 116. The lock pin 116 may be configured to pass through the opening 510 in the guide tube 128 and opening 512 in the drive rod 126 to engage the drive rod 126. By engaging the drive rod 126, the lock pin 116 may lock the lift frame 114 in the horizontal position. Therefore, by engaging the drive rod 126 and the guide tube 128 connected to the beam 104, the lock pin 116 may indirectly engage the beam 104 to lock the lift frame 114 in the horizontal position.

The cable 120 may include a cable core 514 and a cable sleeve 516. The cable core 514 may be slidable inside the cable sleeve 516. Connecting the cable 120 to the first cable connector 506 may include connecting the cable core 514 to the first cable connector 506.

The lift table apparatus 100 may further have a fixing bracket 518 configured to be connected to the beam 104 of the log splitter 102. The cable 120 may be connected to the beam 104 by connecting the cable sleeve 516 to the fixing bracket 518.

When the cable 120 pulls the lock pin 116, the cable 120 may disengage the lock pin 116 from the drive rod 126, which may result in moving the lift frame 114 from the horizontal position to the vertical position. Specifically, when the cable 120 is pulled, the cable core 514 may slide inside the cable sleeve 516. As the cable sleeve 516 is fixed to the beam 104 via the fixing bracket 518, the cable sleeve 516 may stay in place, while the cable core 514 may move inside the cable sleeve 516. Therefore, pulling the cable 120 results in pulling the cable core 514 connected to the first cable connector 506. As the first cable connector 506 is connected to the lock pin 116, pulling the cable core 514 may move the lock pin 116 out of the opening 512 in the drive rod 126 and out of the opening 510 in the guide tube 128, thereby disengaging the lock pin 116 from the drive rod 126.

Figure 6:
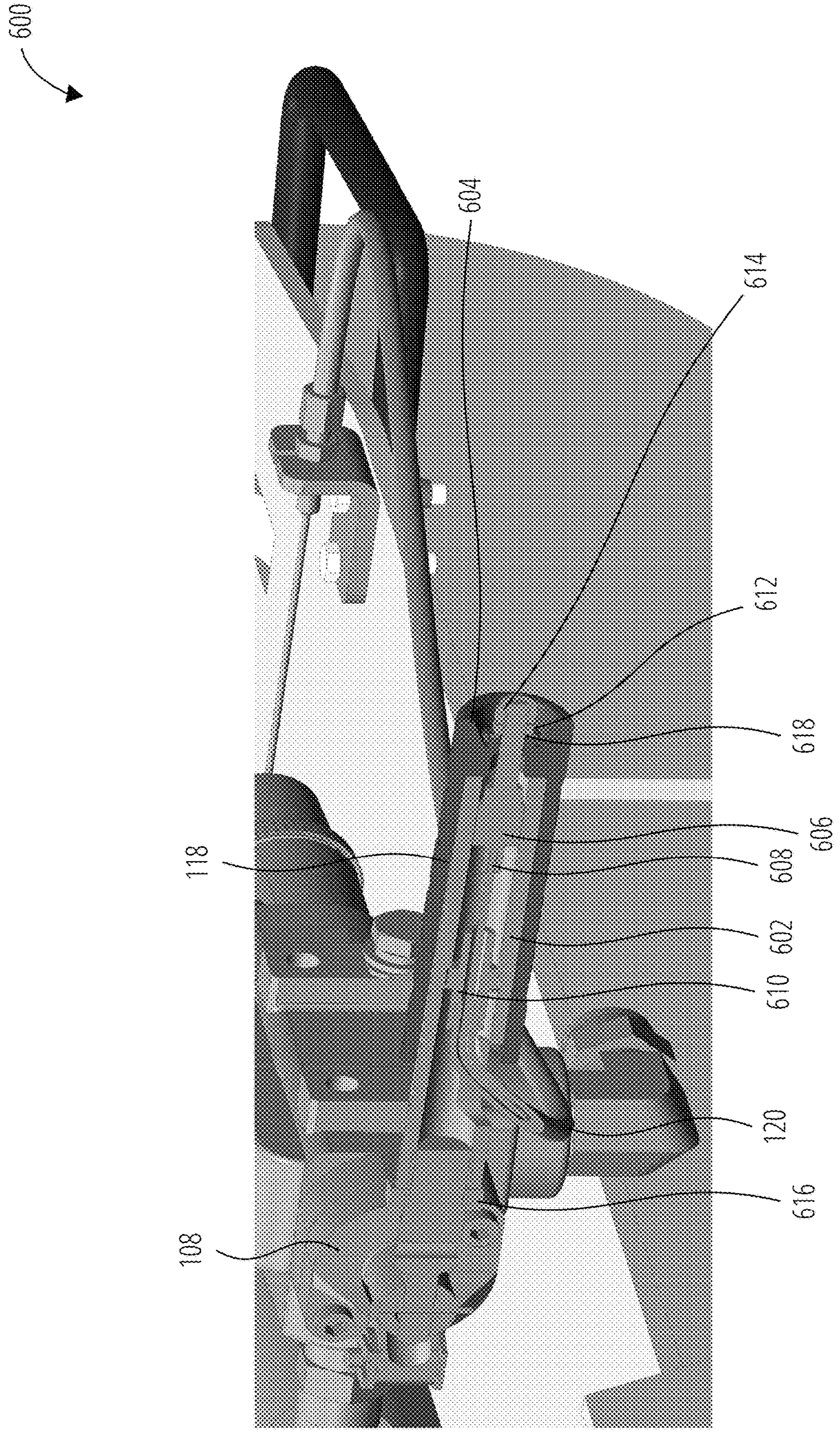
FIG. 6 is a detailed cross-section view of a control lever of a lift table apparatus, according to an example embodiment.

FIG. 6 is a detailed cross-section view 600 of a control lever, according to an example embodiment. The control lever 118 may include a lever tube 602 and a sliding grip 604 enclosing the lever tube 602. The control lever 118 is a lever for controlling the hydraulic flow control valve 108 of the hydraulic cylinder 106 of the log splitter 102. The control lever 118 may have a sliding grip 604, which may be slidable and spring-loaded. The movement of the sliding grip 604 may activate the cable 120 that is located in the lever tube 602 and connected to the sliding grip 604. The cable 120 may be connected to the lock pin 116 configured to engage the beam 104 to secure the lift frame 114 in place. The cable 120 may be used for controlling movement of the lift frame 114 from the horizontal position to the vertical position and vice versa and for fixing the lift frame 114 in the horizontal position. Specifically, when the sliding grip 604 is pulled out, the cable 120 pulls the lock pin 116 out to release the lift frame 114. Then, the lift frame 114 may resume to move with the hydraulic cylinder 106 for the next logs lift.

Figure 7:
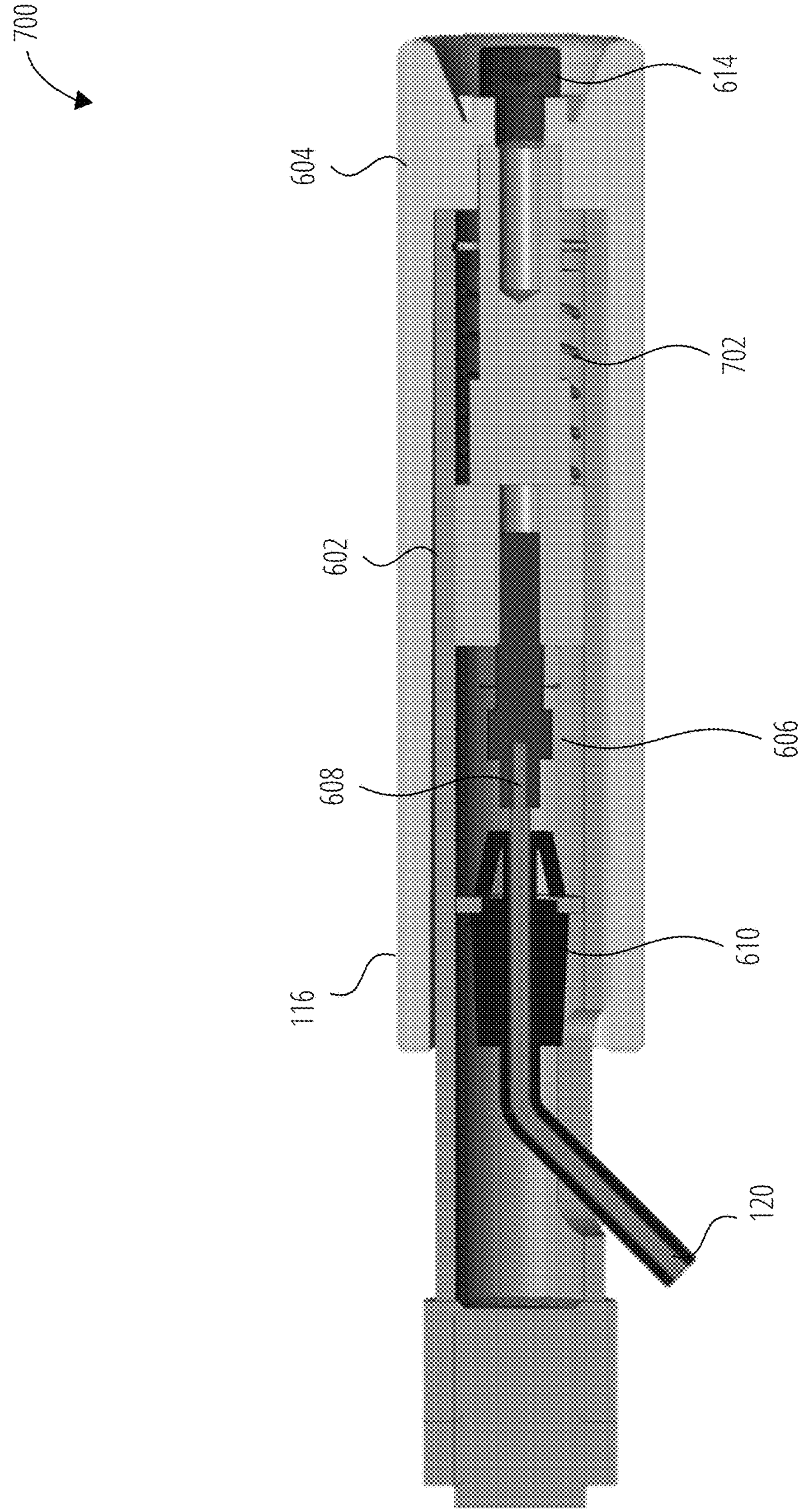
FIG. 7 is a side cross-section view of a control lever of a lift table apparatus, according to an example embodiment.

FIG. 7 is a side cross-section view 700 of a control lever 118 of a lift table apparatus 100, according to an example embodiment. The control lever 118 may further have a second spring 702 located inside the lever tube 602. As shown in FIG. 6 and FIG. 7, the cable 120 may be located in the lever tube 602 and connected to the sliding grip 604.

The control lever 118 may further include a second cable connector 606 located inside the lever tube 602. The cable 120 may be connected to the second cable connector 606 by a second end 608 of the cable 120. The second spring 702 may be configured to load the second cable connector 606. The sliding grip 604, when pulled, may pull the second cable connector 606 and the cable 120 connected to the second cable connector 606.

The control lever 118 may further include a first cable mount sleeve 610 fixed in the lever tube 602. The cable 120 may pass through the first cable mount sleeve 610.

The control lever 118 may further have a first lock nut 612 screwed on the second cable connector 606. The sliding grip 604 may have an opening 618 and the second cable connector 606 may extend through the opening 618.

The control lever 118 may further have a cap nut 614 screwed on the second cable connector 606 over the first lock nut 612. The first lock nut 612 and the cap nut 614 may not allow the sliding grip 604 to be taken away from the lever tube 602.

The control lever 118 may further have a second lock nut 616 ensuring the connection of the control lever 118 to the hydraulic flow control valve 108.

Figure 8:
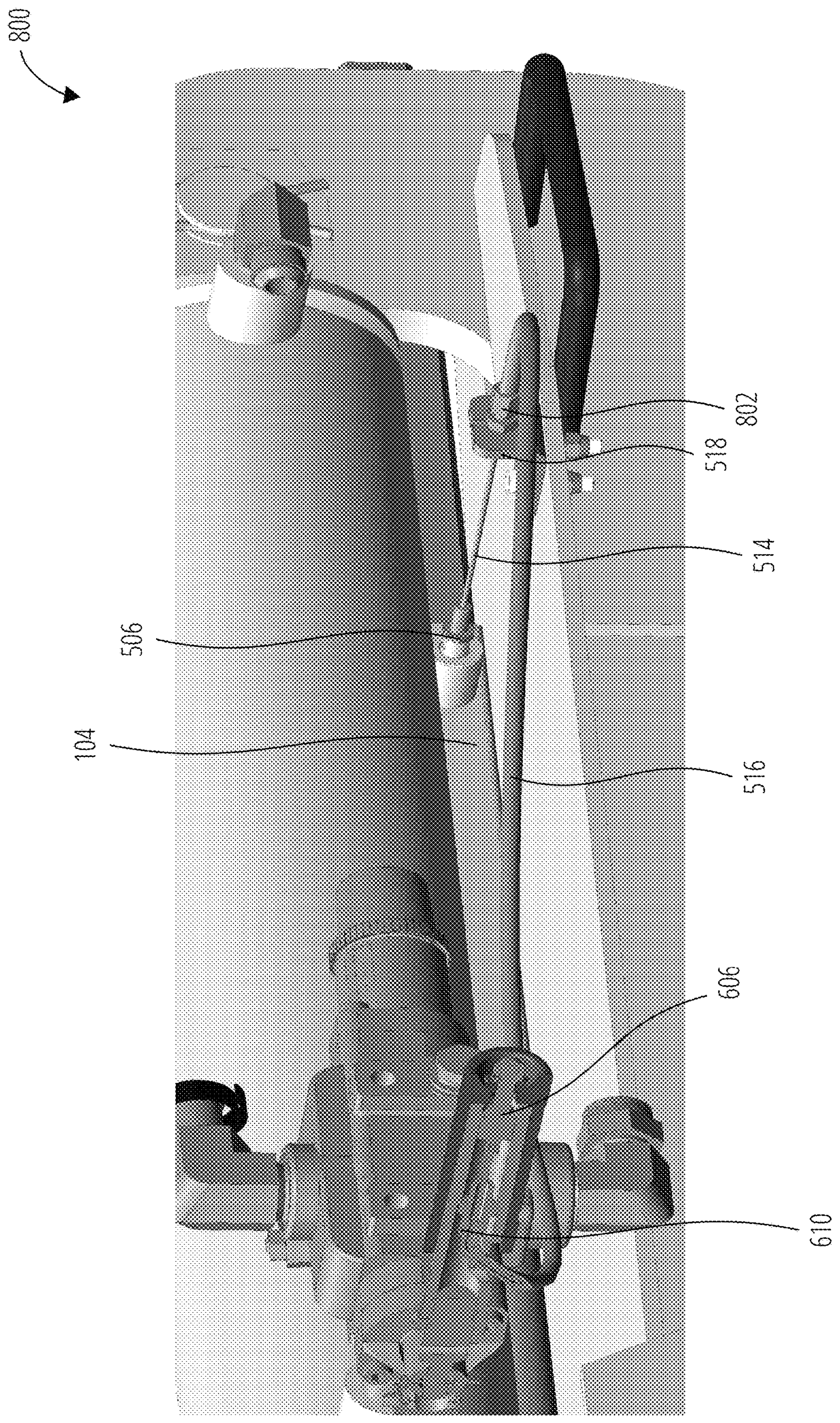
FIG. 8 is a detailed cross-section view illustrating connection of a cable to a control lever and to a beam of a log splitter, according to an example embodiment.

FIG. 8 is a detailed cross-section view 800 illustrating connection of a cable to a control lever and to a beam of a log splitter, according to an example embodiment. The lift table apparatus 100 may further include a second cable mount sleeve 802 configured to be connected to the beam 104 of the log splitter. The cable 120 may pass through the second cable mount sleeve 802. Specifically, the second cable mount sleeve 802 may be connected to the fixing bracket 518 fixed to the beam 104.

Referring again to FIG. 1, in an example embodiment, when rotated counterclockwise around an axis (e.g., a vertical axis in the embodiment shown in FIG. 1), the control lever 118 may cause retraction of the hydraulic cylinder 106. When rotated clockwise around the axis (e.g., a vertical axis in the embodiment shown in FIG. 1), the control lever 118 may cause an extension of the hydraulic cylinder 106. The lift frame 114 may be movable from the horizontal position to the vertical position by the hydraulic cylinder 106 when the hydraulic cylinder 106 is extended.

The control lever 118 may be configured to be simultaneously pulled and rotated clockwise around the axis. Pulling the control lever 118 causes disengaging the lock pin 116 from the drive rod 126 and rotating the control lever 118 clockwise causes extension of the hydraulic cylinder 106 (which causes moving the splitting wedge to split a log) and moving the lift frame 114 from the horizontal position to the vertical position. Moreover, the control lever 118 may be configured to be simultaneously released and rotated counterclockwise around the axis. Releasing the control lever 118 causes engaging the lock pin 116 with the drive rod 126, and rotating the control lever 118 counterclockwise causes retraction of the hydraulic cylinder 106 and moving the lift frame 114 from the vertical position to the horizontal position. Thus, by using the lock pin 116 and the control lever 118 with the cable 120 connected to the lock pin 116 and the control lever 118, the lift frame 114 may be automatically locked into a horizontal position and remain in the horizontal position to work as a log table without moving with the hydraulic cylinder. The lift frame 114 returns to the ground for another log lift after being released by the sliding grip 604 on the control lever 118.

Figure 9:
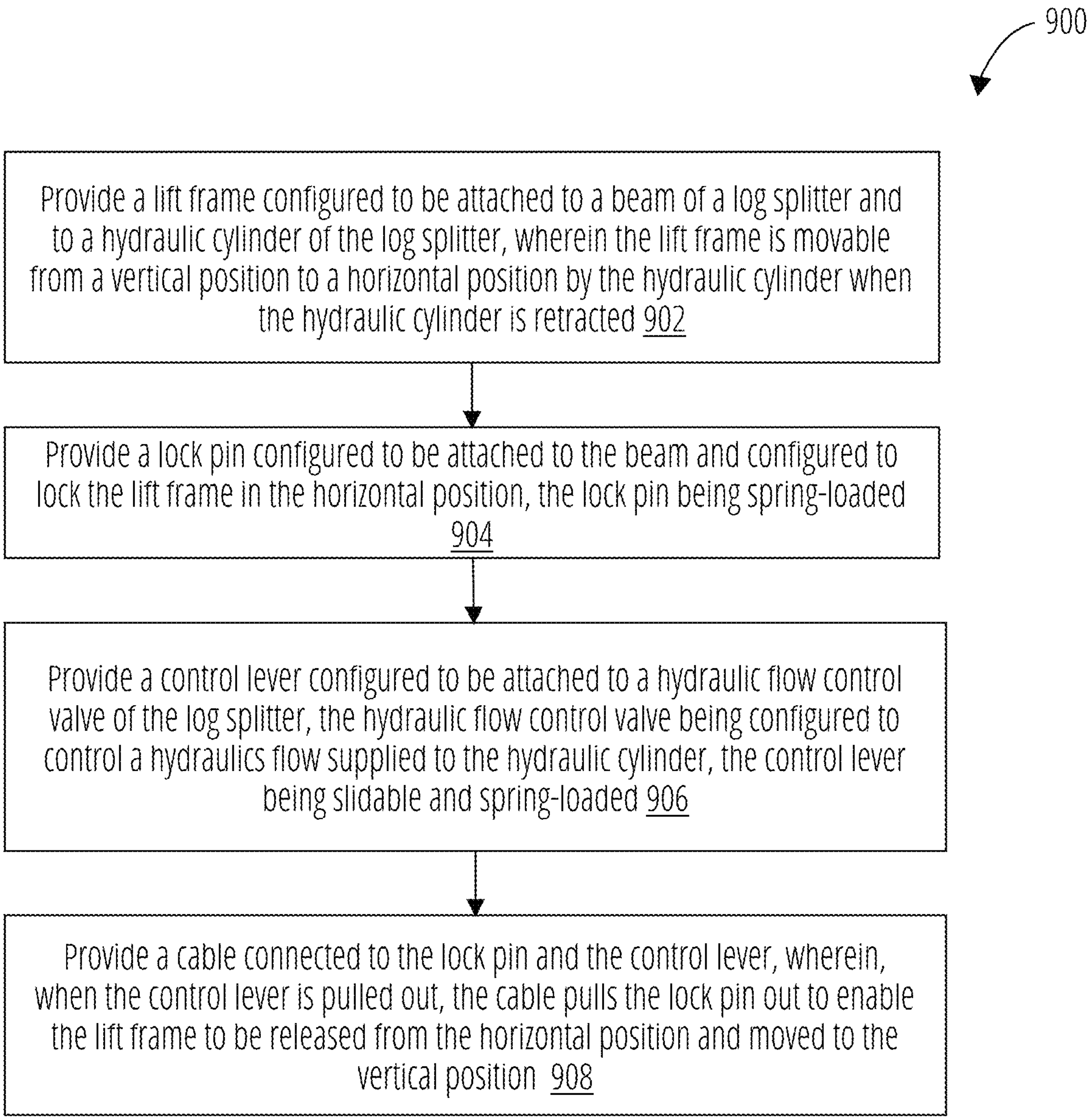
FIG. 9 illustrates a method for providing a lift table apparatus, according to an example embodiment.

FIG. 9 is a flow chart of a method 900 for providing a lift table apparatus, according to an example embodiment. In some embodiments, the operations may be combined, performed in parallel, or performed in a different order. The method 900 may also include additional or fewer operations than those illustrated.

The method 900 may commence with providing a lift frame in block 902. The lift frame may be configured to be attached to a side of a beam of a log splitter and to a hydraulic cylinder of the log splitter. The lift frame may be movable from a vertical position to a horizontal position by the hydraulic cylinder when the hydraulic cylinder is retracted.

In block 904, the method 900 may include providing a lock pin. The lock pin may be spring-loaded and configured to be attached to the beam and configured to lock the lift frame in the horizontal position.

The method 900 may continue with providing a control lever in block 906. The control lever may be configured to be attached to a hydraulic flow control valve of the log splitter. The hydraulic flow control valve may be configured to control a hydraulics flow supplied to the hydraulic cylinder. The control lever may be slidable and spring-loaded.

In an example embodiment, the providing of the control lever may include providing a lever tube, a sliding grip enclosing the lever tube, and a second spring located inside the lever tube. The cable may be located in the lever tube and connected to the sliding grip. In an example embodiment, the providing of the control lever may further include providing a second cable connector located inside the lever tube. The cable may be connected to the second cable connector by a second end of the cable. The second spring may be configured to load the second cable connector. The sliding grip, when pulled, may pull the second cable connector and the cable.

In block 908, the method 900 may continue with providing a cable. The cable may be connected to the lock pin and the control lever. When the control lever is pulled out, the cable may pull the lock pin out to enable the lift frame to be released from the horizontal position and moved to the vertical position.

The method 900 may further include providing a drive rod, a guide tube for enclosing and driving the drive rod, and a link rod connecting the lift frame to the drive rod. The guide tube may be configured to be connected to the beam of the log splitter. The method 900 may further include providing a push rod. The push rod may be configured to connect to a wedge base of the log splitter. The push rod may be configured to push the drive rod when the wedge base is moved by the hydraulic cylinder when the hydraulic cylinder is retracted.

The method 900 may further include providing a lock pin sleeve connected to the guide tube. The lock pin may be located inside the lock pin sleeve. The method 900 may continue with providing a first spring located inside the lock pin sleeve and configured to load the lock pin and providing a first cable connector connected to the lock pin. The cable may be connected to the first cable connector by a first end of the cable. The lock pin may be configured to pass through an opening in the guide tube and engage the drive rod to lock the lift frame in the horizontal position. The cable, when pulling the lock pin, may disengage the lock pin from the drive rod to move the lift frame from the horizontal position to the vertical position.

Thus, a lift table apparatus for log splitting and a method for providing a lift table apparatus for log splitting are disclosed. While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A lift table apparatus for log splitting, the lift table apparatus comprising:

- a lift frame configured to be attached to a beam of a log splitter and to a hydraulic cylinder of the log splitter, wherein the lift frame is movable from a vertical position to a horizontal position by the hydraulic cylinder when the hydraulic cylinder is retracted;
- a lock pin configured to be attached to the beam and configured to lock the lift frame in the horizontal position, the lock pin being spring-loaded;
- a control lever configured to be attached to a hydraulic flow control valve of the log splitter, the hydraulic flow control valve being configured to control a hydraulics flow supplied to the hydraulic cylinder, the control lever being slidable and spring-loaded; and
- a cable connected to the lock pin and the control lever, wherein, when the control lever is pulled out, the cable pulls the lock pin out to enable the lift frame to be released from the horizontal position and moved to the vertical position.

2. The lift table apparatus of claim 1, further comprising a drive rod, a guide tube for enclosing and driving the drive rod, and a link rod connecting the lift frame to the drive rod, the guide tube being configured to be connected to the beam.

3. The lift table apparatus of claim 2, further comprising:

- a bracket connecting the link rod and the drive rod; and
- a groove cut in the guide tube, wherein the bracket passes through the groove.

4. The lift table apparatus of claim 3, wherein the link rod is connected to the bracket via a first pivot joint, wherein the link rod is connected to the lift frame via a second pivot joint.

5. The lift table apparatus of claim 2, further comprising a push rod, the push rod being configured to be connected to a wedge base of the log splitter, the push rod being configured to push the drive rod when the wedge base is moved by the hydraulic cylinder when the hydraulic cylinder is retracted.

6. The lift table apparatus of claim 2, further comprising:

- a lock pin sleeve connected to the guide tube, wherein the lock pin is located inside the lock pin sleeve;
- a first spring located inside the lock pin sleeve and configured to load the lock pin; and
- a first cable connector connected to the lock pin, wherein the cable is connected to the first cable connector by a first end of the cable;
- wherein the lock pin is configured to pass through an opening in the guide tube and engage the drive rod to lock the lift frame in the horizontal position; and
- wherein the cable, when pulling the lock pin, disengages the lock pin from the drive rod to move the lift frame from the horizontal position to the vertical position.

7. The lift table apparatus of claim 1, further comprising a pivot shaft configured to be connected to the beam, the lift frame being installed on the pivot shaft.

8. The lift table apparatus of claim 1, wherein the cable includes a cable core and a cable sleeve, the cable core being slidable inside the cable sleeve.

9. The lift table apparatus of claim 1, wherein the control lever includes a lever tube, a sliding grip enclosing the lever tube, and a second spring located inside the lever tube, wherein the cable is located in the lever tube and connected to the sliding grip.

10. The lift table apparatus of claim 9, wherein the control lever further includes a second cable connector located inside the lever tube, wherein the cable is connected to the second cable connector by a second end of the cable;

- wherein the second spring is configured to load the second cable connector; and
- wherein the sliding grip, when pulled, pulls the second cable connector and the cable.

11. The lift table apparatus of claim 9, wherein the control lever further includes a first cable mount sleeve fixed in the lever tube, wherein the cable passes through the first cable mount sleeve.

12. The lift table apparatus of claim 1, further comprising a second cable mount sleeve configured to be connected to the beam, wherein the cable passes through the second cable mount sleeve.

13. The lift table apparatus of claim 1, wherein, when rotated counterclockwise around an axis, the control lever causes a retraction of the hydraulic cylinder; and

- wherein, when rotated clockwise around the axis, the control lever causes an extension of the hydraulic cylinder, wherein the lift frame is movable from the horizontal position to the vertical position by the hydraulic cylinder when the hydraulic cylinder is extended.

14. The lift table apparatus of claim 13, wherein:

- the control lever is configured to be simultaneously pulled and rotated clockwise around the axis; and
- the control lever is configured to be simultaneously released and rotated counterclockwise around the axis.

15. A method for providing a lift table apparatus, the method comprising:

- providing a lift frame configured to be attached to a beam of a log splitter and to a hydraulic cylinder of the log splitter, wherein the lift frame is movable from a vertical position to a horizontal position by the hydraulic cylinder when the hydraulic cylinder is retracted;
- providing a lock pin configured to be attached to the beam and configured to lock the lift frame in the horizontal position, the lock pin being spring-loaded;
- providing a control lever configured to be attached to a hydraulic flow control valve of the log splitter, the hydraulic flow control valve being configured to control a hydraulics flow supplied to the hydraulic cylinder, the control lever being slidable and spring-loaded; and
- providing a cable connected to the lock pin and the control lever, wherein, when the control lever is pulled out, the cable pulls the lock pin out to enable the lift frame to be released from the horizontal position and moved to the vertical position.

16. The method of claim 15, further comprising providing a drive rod, a guide tube for enclosing and driving the drive rod, and a link rod connecting the lift frame to the drive rod, the guide tube being configured to be connected to the beam.

17. The method of claim 16, further comprising providing a push rod, the push rod being configured to be connected to a wedge base of the log splitter, the push rod being configured to push the drive rod when the wedge base is moved by the hydraulic cylinder when the hydraulic cylinder is retracted.

18. The method of claim 16, further comprising:

providing a lock pin sleeve connected to the guide tube, wherein the lock pin is located inside the lock pin sleeve;

providing a first spring located inside the lock pin sleeve and configured to load the lock pin; and providing a first cable connector connected to the lock pin, wherein the cable is connected to the first cable connector by a first end of the cable;

wherein the lock pin is configured to pass through an opening in the guide tube and engage the drive rod to lock the lift frame in the horizontal position; and wherein the cable, when pulling the lock pin, disengages the lock pin from the drive rod to move the lift frame from the horizontal position to the vertical position.

19. The method of claim 15, wherein the providing the control lever includes:

providing a lever tube;

providing a sliding grip enclosing the lever tube; and providing a second spring located inside the lever tube, wherein the cable is located in the lever tube and connected to the sliding grip.

20. The method of claim 19, wherein the providing the control lever further includes providing a second cable connector located inside the lever tube, wherein the cable is connected to the second cable connector by a second end of the cable;

wherein the second spring is configured to load the second cable connector; and wherein the sliding grip, when pulled, pulls the second cable connector and the cable.

* * * * *